US012007098B2

(12) United States Patent
Baxter et al.

(10) Patent No.: US 12,007,098 B2
(45) Date of Patent: Jun. 11, 2024

(54) SPORTS LIGHT HAVING SINGLE MULTI-FUNCTION BODY

(71) Applicant: SPORTSBEAMS LIGHTING, INC., Round Rock, TX (US)

(72) Inventors: Kevin C. Baxter, Henderson, NV (US); Wei Cao, Shanghai (CN); Jianjun Gu, Shanghai (CN)

(73) Assignee: Sportsbeams Lighting, Inc., Round Rock, TX (US)

( * ) Notice: Subject to any disclaimer, the term of this patent is extended or adjusted under 35 U.S.C. 154(b) by 0 days.

(21) Appl. No.: 16/544,771

(22) Filed: Aug. 19, 2019

(65) Prior Publication Data

US 2020/0056764 A1 Feb. 20, 2020

Related U.S. Application Data

(60) Provisional application No. 62/719,508, filed on Aug. 17, 2018.

(51) Int. Cl.
*F21V 15/01* (2006.01)
*F21V 7/04* (2006.01)
(Continued)

(52) U.S. Cl.
CPC ................ *F21V 15/01* (2013.01); *F21V 7/04* (2013.01); *F21V 17/10* (2013.01); *F21V 19/003* (2013.01);
(Continued)

(58) Field of Classification Search
CPC ...... F21V 15/013; F21V 31/00; F21V 23/008; F21V 31/005; F21V 29/773; F21S 8/033; F21S 8/36; F21S 8/37; F21K 9/233
See application file for complete search history.

(56) References Cited

U.S. PATENT DOCUMENTS 5,036,248 A 7/1991 Mcewan et al.
5,134,557 A * 7/1992 Gordin .................... F21S 8/033
362/261

(Continued)

FOREIGN PATENT DOCUMENTS

CN 101142435 A 3/2008
CN 102606945 A 7/2012

(Continued)

OTHER PUBLICATIONS

International Search Report and Written Opinion prepared in PCT/US2019/047108 dated Dec. 11, 2019 prepared by the ISA/US.

*Primary Examiner* — Colin J Cattanach
(74) *Attorney, Agent, or Firm* — Scott R. Zingerman; GableGotwals

(57) ABSTRACT

A sports lighting fixture including a single cast body which combines the functions of the base, heatsink, reflector housing, and interconnection gaskets, with many cast female holes that are later tapped with threads to eliminate the need for any nuts as fasteners. As a result, the single body becomes multi-functional. Channels may be cast into the single piece body to allow for heat pipes to be press fit. Several locations on the body may include tapped holes to attach mounting hardware (lens retainer), visors, power supply, and LED array printed circuit board. The body includes a cavity to receive a reflector. The reflector may be a single unit or segmented. The cavity may alternatively be coated with reflective material. The body incudes heat fins which extend from the back of the fixture and transition forward around the reflector cavity toward a front opening.

21 Claims, 8 Drawing Sheets

(51) Int. Cl.

| | |
|---|---|
| ***F21V 17/10*** | (2006.01) |
| ***F21V 19/00*** | (2006.01) |
| ***F21V 23/02*** | (2006.01) |
| ***F21V 29/77*** | (2015.01) |
| ***F21V 31/00*** | (2006.01) |
| ***F21W 131/105*** | (2006.01) |
| ***F21Y 113/17*** | (2016.01) |
| ***F21Y 115/10*** | (2016.01) |

(52) U.S. Cl.
CPC ............ *F21V 23/02* (2013.01); *F21V 29/773* (2015.01); *F21V 31/005* (2013.01); *F21W 2131/105* (2013.01); *F21Y 2113/17* (2016.08); *F21Y 2115/10* (2016.08)

(56) References Cited

U.S. PATENT DOCUMENTS

| | | | | |
|---|---|---|---|---|
| 6,241,366 | B1 | 6/2001 | Roman et al. | |
| 6,796,690 | B2 | 9/2004 | Bohlander | |
| 7,244,048 | B2 | 7/2007 | Poggi | |
| 7,484,863 | B1 | 2/2009 | Aubrey | |
| 7,600,892 | B2 | 10/2009 | Belliveau et al. | |
| 7,629,570 | B2 | 12/2009 | Mondloch et al. | |
| 8,523,397 | B1 | 9/2013 | Gordin | |
| 8,581,513 | B1 | 11/2013 | Reinoso | |
| 8,662,702 | B2 | 3/2014 | Datz et al. | |
| 8,702,255 | B2 | 4/2014 | Baxter et al. | |
| 8,888,319 | B2 | 11/2014 | Lee et al. | |
| 8,911,116 | B2 * | 12/2014 | Blincoe | F21V 7/00 362/294 |
| 10,738,967 | B2 * | 8/2020 | Cao | F21V 7/04 |
| 2003/0179584 | A1 | 9/2003 | Pond et al. | |
| 2005/0111234 | A1 | 5/2005 | Martin et al. | |
| 2006/0083017 | A1 | 4/2006 | Wang et al. | |
| 2006/0139659 | A1 | 6/2006 | Steinberg | |
| 2007/0139921 | A1 | 6/2007 | Wu | |
| 2008/0212333 | A1 | 9/2008 | Chen | |
| 2009/0080193 | A1 * | 3/2009 | Peck | F21V 29/763 362/249.02 |
| 2009/0237937 | A1 | 9/2009 | Liu | |
| 2010/0204841 | A1 * | 8/2010 | Chemel | H05B 45/20 700/282 |
| 2010/0242519 | A1 | 9/2010 | Breidenassel et al. | |
| 2011/0013401 | A1 | 1/2011 | Gordin et al. | |
| 2011/0043120 | A1 | 2/2011 | Panagotacos et al. | |
| 2011/0068708 | A1 * | 3/2011 | Coplin | F21V 13/04 315/294 |
| 2011/0182065 | A1 * | 7/2011 | Negley | F21K 9/62 362/231 |
| 2012/0057352 | A1 * | 3/2012 | Wilcox | F21V 29/713 362/308 |
| 2012/0092870 | A1 | 4/2012 | Tralli et al. | |
| 2012/0106174 | A1 * | 5/2012 | Chuang | F21K 9/233 362/375 |
| 2012/0217897 | A1 * | 8/2012 | Gordin | F21V 5/04 315/294 |
| 2012/0287613 | A1 * | 11/2012 | Hamel | F21V 29/83 362/184 |
| 2013/0088142 | A1 * | 4/2013 | Allen | F21K 9/62 313/498 |
| 2013/0107528 | A1 | 5/2013 | Boyer et al. | |
| 2013/0170212 | A1 * | 7/2013 | Cuda | F21V 23/02 362/249.02 |
| 2013/0208489 | A1 * | 8/2013 | Schmuckle | F21K 9/20 362/363 |
| 2013/0223064 | A1 | 8/2013 | Lee et al. | |
| 2014/0022780 | A1 * | 1/2014 | Roberge | F21V 29/006 362/231 |
| 2014/0043810 | A1 | 2/2014 | Jo et al. | |
| 2014/0085882 | A1 * | 3/2014 | Clifford | F21V 5/007 362/235 |
| 2014/0092593 | A1 * | 4/2014 | Gordin | F21V 14/04 362/232 |
| 2014/0119019 | A1 | 5/2014 | Hsu | |
| 2014/0126214 | A1 * | 5/2014 | Gebhard | F21V 23/006 362/294 |
| 2014/0252940 | A1 * | 9/2014 | Kinnune | F21V 29/508 313/46 |
| 2014/0254179 | A1 * | 9/2014 | Miletich | F21S 8/04 362/373 |
| 2015/0264765 | A1 | 9/2015 | Gerszberg | |
| 2015/0308655 | A1 * | 10/2015 | Holmes | F21V 29/59 362/235 |
| 2016/0053982 | A1 | 2/2016 | Kovalchick et al. | |
| 2016/0286629 | A1 | 9/2016 | Chen et al. | |
| 2016/0320004 | A1 * | 11/2016 | Tudorica | F21K 9/66 |
| 2016/0320026 | A1 * | 11/2016 | Duckworth | F21V 29/763 |
| 2016/0348861 | A1 * | 12/2016 | Bailey | F21V 7/28 |
| 2017/0002996 | A1 * | 1/2017 | Wang | F21V 19/003 |
| 2017/0073048 | A1 * | 3/2017 | Butcher | F21V 23/001 |
| 2017/0167695 | A1 * | 6/2017 | Erdener | H05B 47/24 |
| 2017/0184288 | A1 * | 6/2017 | Owens | F21V 19/003 |
| 2017/0245349 | A1 | 8/2017 | Van Der Brug | |
| 2017/0257925 | A1 | 9/2017 | Forbis et al. | |
| 2018/0003370 | A1 * | 1/2018 | Mandlekar | F21V 31/005 |
| 2018/0020346 | A1 | 1/2018 | Li | |
| 2018/0058676 | A1 * | 3/2018 | Huang | F21V 23/005 |
| 2018/0142881 | A1 * | 5/2018 | Corkill | F21V 29/763 |
| 2018/0156437 | A1 * | 6/2018 | Freer | F21V 5/04 |
| 2018/0266646 | A1 * | 9/2018 | Sanchez | F21S 41/143 |
| 2019/0056098 | A1 * | 2/2019 | Blake | F21V 29/773 |
| 2019/0203924 | A1 * | 7/2019 | Devappa | F21V 23/008 |

FOREIGN PATENT DOCUMENTS

| | | | |
|---|---|---|---|
| CN | 102606945 | B | 11/2013 |
| CN | 103492787 | A | 1/2014 |
| JP | 2002-043074 | | 2/2002 |
| JP | 2011-505702 | | 2/2011 |
| JP | 2011-090854 | A | 5/2011 |
| JP | 2012-094316 | | 5/2012 |
| JP | 2012-531703 | | 12/2012 |
| TW | 200535372 | A | 11/2005 |
| TW | M448605 | U | 3/2013 |
| WO | 2009071110 | A1 | 6/2009 |
| WO | 2010058326 | | 5/2010 |
| WO | 2010150170 | A1 | 12/2010 |
| WO | 2012099391 | A2 | 7/2012 |
| WO | 2014021087 | A1 | 2/2014 |

* cited by examiner

SPORTS LIGHT HAVING SINGLE MULTI-FUNCTION BODY

CROSS-REFERENCE TO RELATED CASES

This application claims the benefit of U.S. provisional patent application Ser. No. 62/719,508 entitled SPORTS LIGHT HAVING SINGLE MULTI-FUNCTION BODY, filed on Aug. 17, 2018, the contents of which are hereby incorporated by reference.

FIELD OF THE INVENTION

Large area lighting involves the lighting used in sports venues, parks, airports, ports and other areas (hereinafter "sports light" inclusively and without limitation) that have similar large geometry problems. Though HID bulbs have traditionally powered these fixtures LED fixtures are now beginning to take over due to their lower maintenance costs.

BACKGROUND OF THE INVENTION

These LED sports light fixtures generally have a compact but powerful LED array which is surrounded with a parabolic shaped reflector. The fixture is usually constructed of many pieces, the base is generally what connects everything together and is what is connected to a swiveling yoke or primary support. High power LED arrays require cooling so a heatsink, usually one of the heaviest components, is also connected to the base. The reflector housing is also connected to the base and typically a gasket is inserted between them to provide a weatherproof seal. These structures are all connected together by a series of bolts or machine screws. There is often a compartment for the power supply that is connected to the base and a weatherproof channel from that compartment to the LED PCB which resides against the heatsink but inside the reflector housing. The reflector housing may have a separate reflector on the inside, or the inside of the reflector housing might have a polished surface. The reflector housing's large open end is then covered by a transparent window, typically a piece of glass that has a gasket which finishes the sealing of the reflector housing and the LEDs inside. All of the above mentioned components are usually connected together by a plurality of bolts or other similar type fasteners.

These LED fixtures differ from some high bay lighting that might have a roughly similar appearance in that the sports lighting fixtures have a beam angle less than 70 degrees and sometimes as little as 10 degrees. Because sports lighting fixtures are commonly used outside, they need to be weatherproof, IP65 or higher, and have increased cooling because they don't always operate in shaded (or indoor) conditions. Instead, they often operate in very hot ambient temperatures while sitting in direct sunlight. These fixtures are more powerful than other types of fixtures because they are designed to cover large areas with a high light level. These sports light fixtures need to be corrosion resistant in order to be used outdoors near the ocean, and also have support mechanisms that allow for very fine control of the aiming as well as compatibility with standard sports lighting poles, cross arms, and platforms. Lastly, these fixtures differ from fixtures employed in other industries/applications because they must have a very long maintenance-free life because they are commonly very inaccessible when mounted to the top of a 125' tall light pole. Maintenance at this height becomes very expensive.

These types of complex fixtures require a large number of parts and a lot of labor to assemble, all of which drives up their price.

SUMMARY OF THE INVENTION

The present invention provides a sports lighting fixture where the main portion of the light is made of a single die-cast part. This single part, or body, combines the functions of the base, heatsink, reflector housing, and interconnection gaskets, with many cast female holes that are later tapped with threads to eliminate the need for any nuts as fasteners. As a result, the single body becomes multi-functional. There can also be channels cast into the inventive single piece body to allow for heat pipes to be press fit in with no secondary operations required. This die-cast part would ideally be made of aluminum, magnesium, or a similar alloy, without limitation. It is also contemplated that the sports light of the present disclosure could be injection molded of thermally conductive plastic such as CoolPoly® (D series for example), available commercially from the Celanese Corporation, Irving, Tex., USA, however, others are also contemplated.

The sports light fixture of the present disclosure will have several locations on its body where tapped holes are available to attach mounting hardware as well as mounting points for optional visors. There will be mounting points for a power supply but the power supply may alternatively be mounted remotely as needed. Heat fins are located at the back of the fixture and transition forward around the reflector housing for greater surface area and a shorter and thicker thermal path which allows a lower thermal resistance between the LEDs and the fins. Only one major gasket is required and that is to seal the glass lens to the reflector housing. There may be a glans employed to seal the wires coming from the power supply which feed the LEDs in the reflector chamber. There are tapped holes at the back of the reflector chamber which are used to help attach the LED array's printed circuit board to the die-cast part.

The LED printed circuit board (PCB) would preferably have white LEDs (such as an array of white LEDs) that are used for primary illumination as well as Red, Green, Blue (RGB) and possibly a phosphor based amber for an RGBWA LED PCB. These different colors (arrays of colors) could be dimmed up and down individually to make very specific colors and there would be at least one dimming channel for each color. When the amber LED is combined with the cool white LED the color temperature can be tuned and yet maintain a high Color Rendering Index (CRI). The RGB LED colors can be used to keep the color centered on the Black Body Line (BBL) as well as providing almost any single color for special effects. Because of the single optic, these different colors tend to mix together and make a homogenous color rather than small specs of individual colors. Ideally these different colored LEDs would be intermixed on the LED PCB for improved homogenous color at the glass aperture.

The sports light of the present disclosure includes a single cast body having an outer dimension and including a plurality of fins on its outer dimension. The single cast body includes a back, a front opening, and an internal cavity and a means for mounting to a support structure. The internal cavity is configured to receive an LED printed circuit board capable of projecting light through the front opening of the body and a reflector for directing light through the front opening. The printed circuit board may include an RGBW (or RGBWA) LED array. The front opening includes a surface adapted to receive a weather proof gasket. A lens which at least partially covers the front opening of the body is preferably secured to the single cast body adjacent the weather proof gasket. A power supply is in electrical communication with the LED printed circuit board. The single cast body is adapted such that the body, in cooperation with the weather proof gasket and the lens renders the internal cavity weather tight. The lens is preferably secured to the body by a retainer ring. At least one visor may be secured to the single cast body.

The reflector may be comprised of a plurality of reflector segments. The printed circuit board may be a chip-on-board printed circuit board. The power supply may secured inside the internal cavity, to the body outside the internal cavity (such as on the back of the body), or remote from the body.

The single cast body preferably includes at least one feed through port which is preferably adapted to being sealed in a weather tight manner. The electrical wiring is preferably suitable for providing electrical communication between the power supply and the LED printed circuit board. The electrical wiring is inserted through the feed through port(s) and is preferably secured by a gland.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
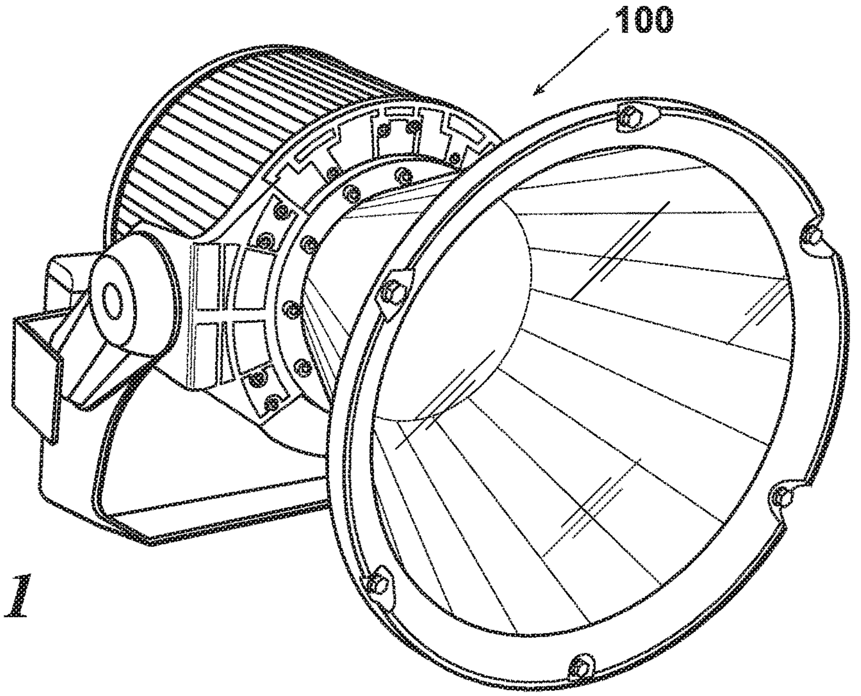
FIG. 1 depicts an exemplary large area LED lighting fixture (prior art).

Referring now to the drawings, wherein like reference numerals indicate the same parts throughout the several views, a representative LED lighting fixture 100 is shown in FIG. 1. This representative LED lighting fixture is manufactured by SportsBeams Lighting, Inc., based in Roundrock, Tex., USA.

Figure 2:
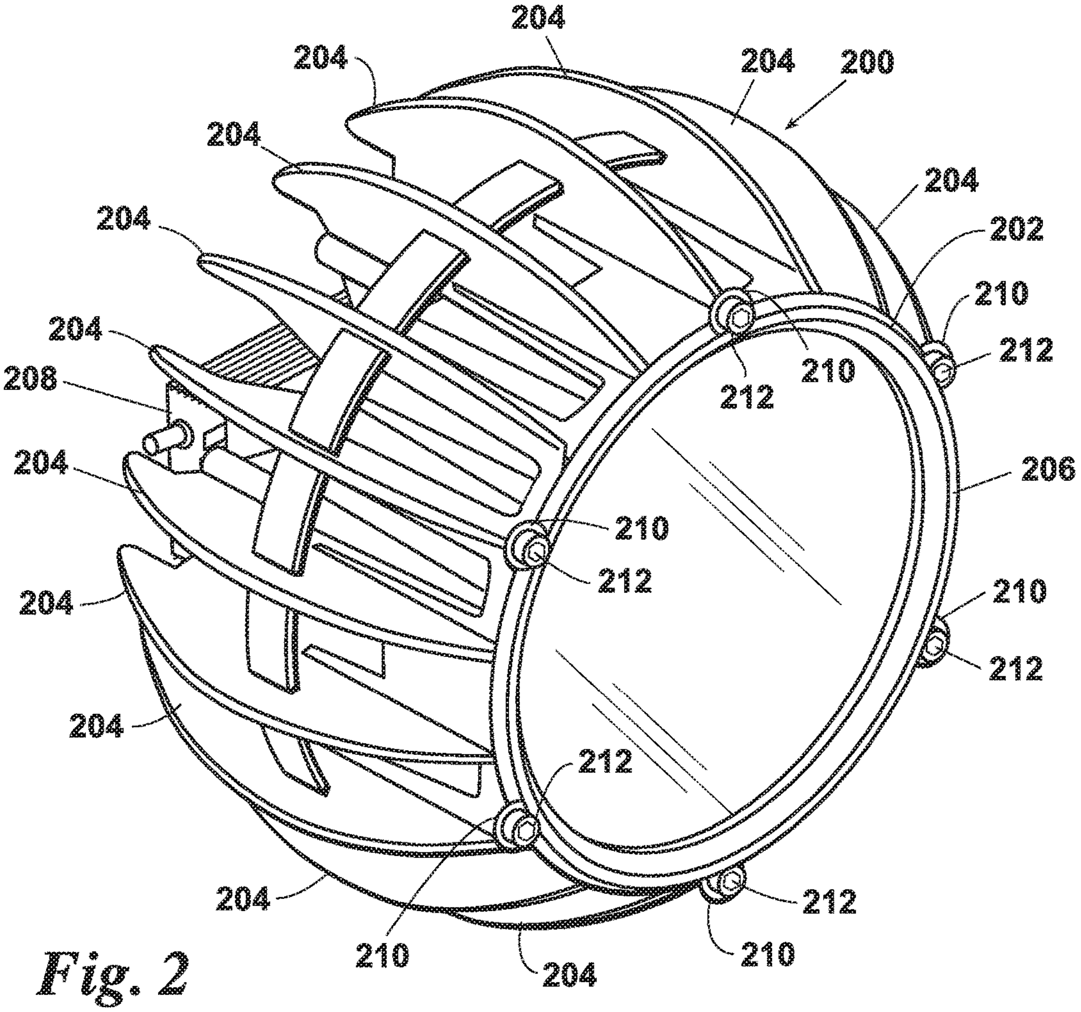
FIG. 2 depicts an isometric view of the single piece body sports light fixture of the present disclosure.

Referring now to the next drawing, the inventive single piece bodied sports light fixture 200 in FIG. 2. In a preferred embodiment, there is a single piece body 202 that has large elements such as the plurality of fins 204 (collectively). There are several (multiple) elements that may bolt on to body 202 such as a lens retaining ring 206 in the front and a power supply 208 in the rear. Retaining ring 206 may be secured to a body 202 at points 210, collectively, using fasteners, 212, collectively.

A mounting means may be part of body 201 or secured thereto. The mounting means secures body 202 to a support structure such as a cross arm support structure known in the art for mounting sports venue lights. Typically fixtures are mounted to a pole by way of cross arms, or perhaps one or more trusses. In some cases, catwalks may be located proximate each cross arm to facilitate aiming and maintenance of the sports light fixtures. The mounting means could be any structure as known in the art or adapted for such mounting, including a knuckle mount, yoke based mount, pendant mount or others as known in the art.

Figure 3:
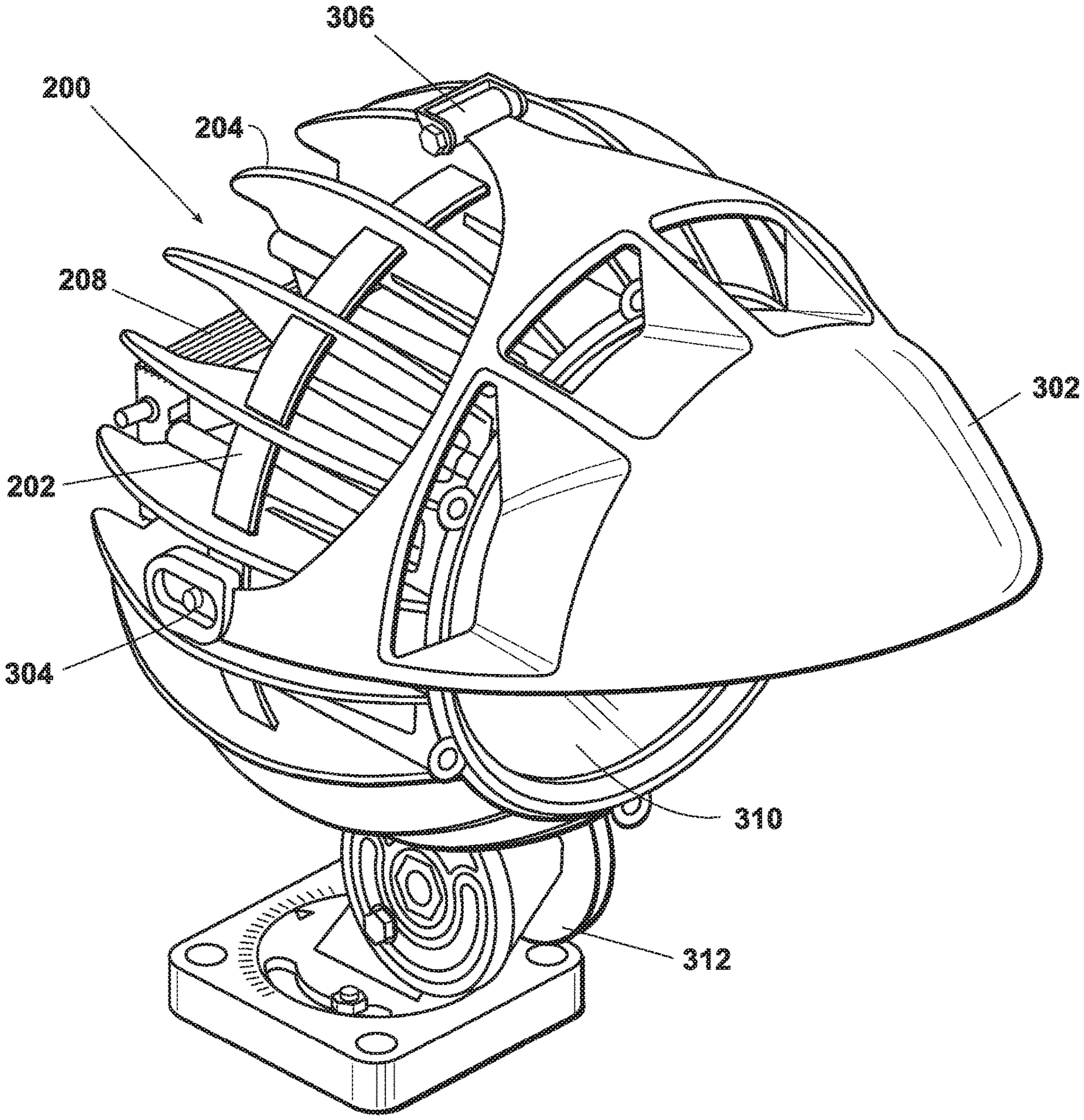
FIG. 3 depicts an isometric view of the single piece bodied sports light fixture of the present disclosure fitted with a visor.

Referring now to FIG. 3, which is the single piece bodied light fixture 200 of the present disclosure of FIG. 2 fitted with a visor. In this embodiment, the visor 302 has mounting points 304-308 (308 not shown) that mount to the single piece body 202 without connecting to the lens 310 area. The depicted mounting means includes a bottom knuckle mount 312. Knuckle mount 312 is positioned well out of the way of the visor 302 and the power supply 208 which is mounted to the rear of the single piece body 202.

Figure 4:
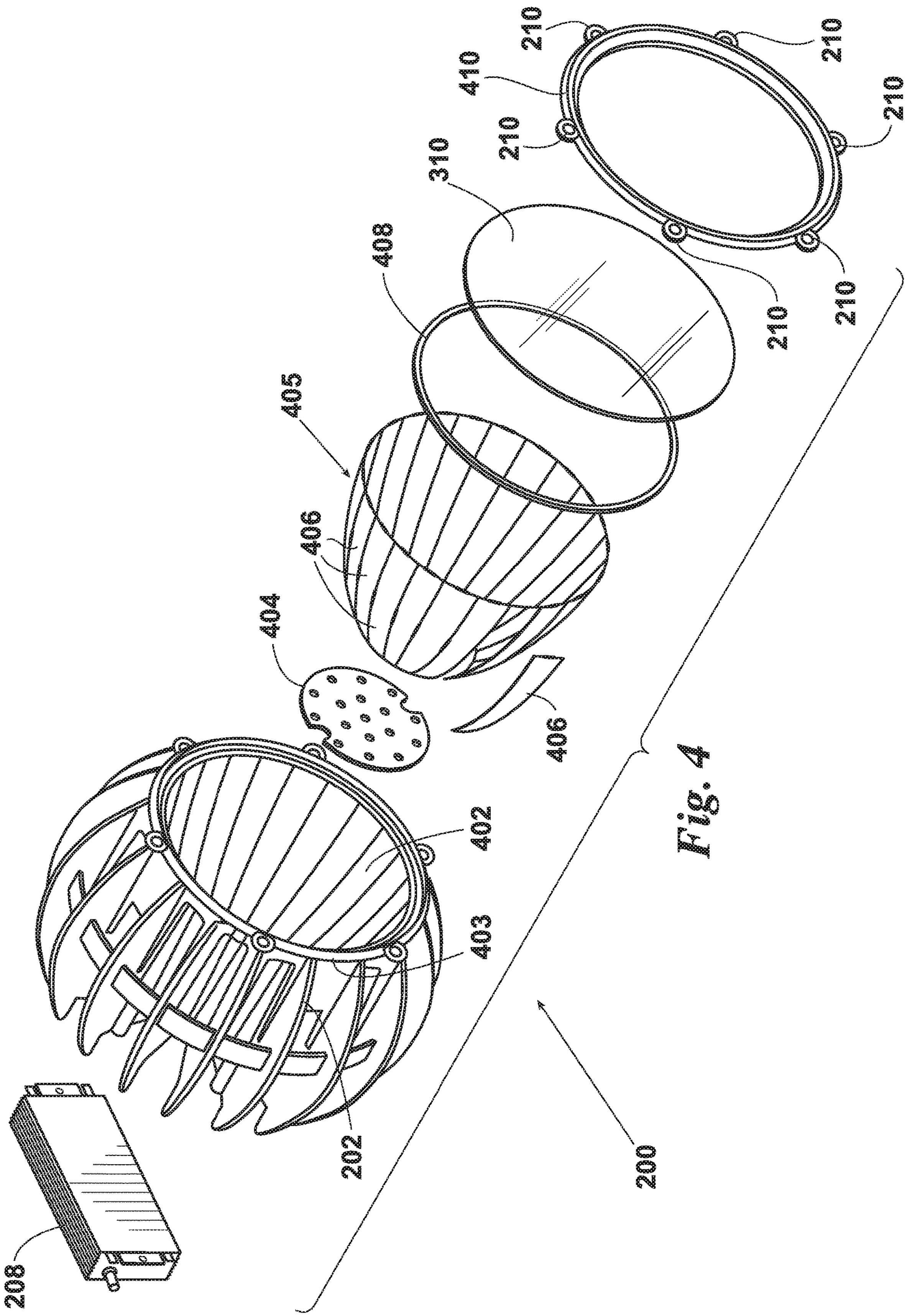
FIG. 4 depicts the single piece body sports light fixture of the present disclosure in an exploded view.

Referring now to the next drawing, an exploded view of the single piece bodied sports light fixture 200 of the present disclosure in FIG. 4. In this exploded view, the front of the body 202 includes a front opening into an internal reflector housing or cavity 402. An LED printed circuit board 404 is positioned in internal cavity 402 and is attached by machine screws in the preferred embodiment. A reflector 405 and/or reflector segments 406 is/are inserted around the interior periphery of cavity 402.

In one preferred embodiment, LED printed circuit board 404 is a chip-on-board, or COB, type module. COB modules typically emit light over about a 120 degree beam.

In another preferred embodiment, rather than using a COB module, the LED module of the inventive sports light employs a (or multiple) large, dense array of surface mount light emitting diodes. Each array includes a plurality of individual LEDs mounted on an aluminum substrate circuit board such as a "direct thermal path" printed circuit board.

In one alternate embodiment, board 404 is laid out in an asymmetrical manner such that the number of LEDs contributing light are greater or fewer at the top than at bottom. Since the fixtures are typically mounted such that the emitted light is not directly overhead of the field but rather strikes the field at an angle, the light intensity will not be the same across the beam (Keystone effect). An asymmetrical array accommodates for this and evens out the projected light intensity over the coverage area of the fixture. As stated above, this delineated, asymmetrical LED array straightens out the keystone effect. In such an embodiment it may also be desirable to include a heat sink which is asymmetrical as well to match the asymmetrical LED array.

It should be understood by one of skill in the art that asymmetrical light distribution may be accomplished in other ways, such as by reflector design, positioning, and the use of a segmented reflector, visor, or visor with a reflective inside surface are other suitable methods of producing asymmetrical light distribution. Such asymmetrical PCB designs and light shaping methods may be determined empirically as a result of the characteristics of the lens selected, the reflector type and geometry, visor size and geometry, as well as the geometry of the field or surface being lit by the sports light fixture. As a result, alternate embodiments may be derived for certain conditions or to accomplish certain goals such as, without limitation, providing even lighting to the field or surface in the avoidance of dark areas or shadows.

In an alternate arrangement, the array may use LEDs of different wattages so as to provide increased intensity areas. This may eliminate perceived dark areas or shadows as may be necessary or desired. Additionally and/or alternatively, LEDs may be grouped together in a plurality of separate electrical channels. This provides benefits in redundancy and other benefits. For example, without limitation, the different channels may be independently dimmed. A preferred arrangement would include at least two dimming channels and preferably a separate dimming channel for each array of a specific color. The preferred arrangement would include one driver for each channel.

LED PCB 404 would preferably have an array of high power LEDs having an input power of 250 watts or more and most preferably have an input power of approximately 350 watts. Printed circuit board 404 includes at least one array of white LEDs in a preferred embodiment that are used for primary illumination as well as Red, Green, Blue (RGB) and/or possibly a phosphor based amber array for an RGBWA LED PCB. These LED arrays of different colors would be dimmed up and down individually to make very specific colors and there would be at least one dimming channel for each color. When the amber LED array is combined with the cool white LED array, the color temperature can be tuned and yet maintain a high Color Rendering Index (CRI). The RGB LED colors can be used to keep the color centered on the Black Body Line (BBL) as well as providing almost any single color for special effects such as pre-game warm-up using the local team's color. Because of the single optic, these different colors tend to mix together and make a homogenous color rather than small specs of individual colors. Ideally these different colored LEDs would be intermixed on the LED PCB for improved homogenous color at the glass aperture.

A digital interface may connect the LED printed circuit board 404 to a host computer to control each LED channel, as well as monitor, track and report information and trending for statistical process control or other purposes. Such computer control may be accomplished by any known protocol, such as internet protocol, DMX, and the like. As a result, complete control and reporting of physical condition of the light, including the power supply, LED printed circuit board and LED array(s) thereon is provided.

The surface 403 of front opening of body 202 is finished to be smooth or contoured to so as to be adapted to receive a weather tight gasket 408. Lens gasket 408 is placed on the open front of the single piece body 202 and then the lens 310 is placed against the gasket 408 to form a weather tight seal. Single piece body 202 is configured such that when gasket 408 is positioned on surface 403 and lens 310 secured thereto, internal cavity 402 becomes sealed weather tight. A lens retaining ring 410 may be applied last to assist in providing a weather tight seal between surface 403 of the front opening of body 202, gasket 408, and lens 310. The lens retaining ring 410 is attached to the single piece body 202 at points 210 with fasteners such as bolts or clamps 212 (FIG. 2). As used herein, the term weather-tight or weather-tight seal does not, necessarily, require an air-tight submersible seal but instead capable of sealing against rain, blown dust and debris and the like.

Figure 11:
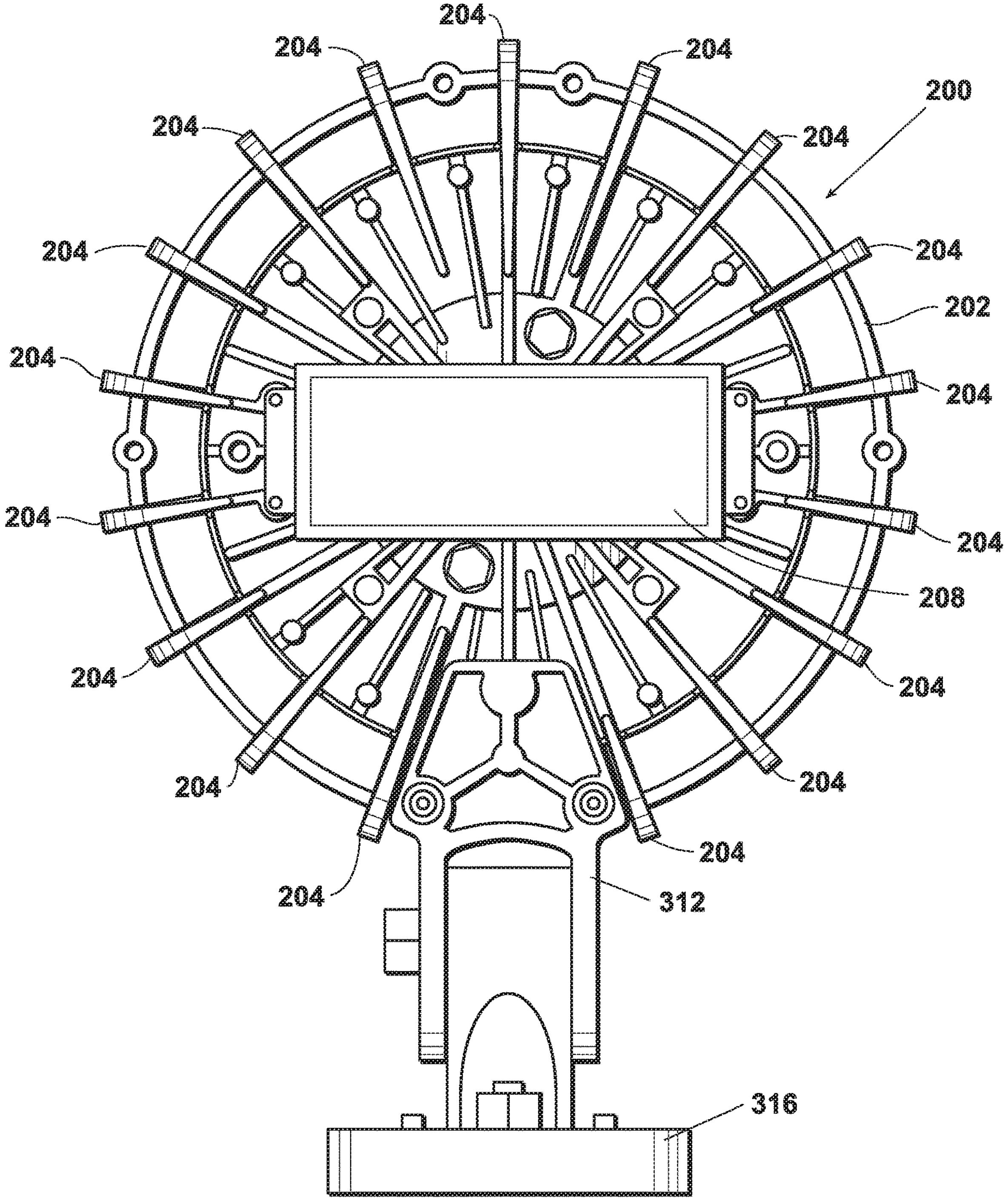
FIG. 11 is a rear view of the single piece bodied sports light fixture of the present disclosure fitted with a back knuckle mount.

Power supply 208 may secured inside internal cavity 402 such that internal cavity 402 is adapted to receive the power supply 208. Alternately, power supply 208 may be secured to the body outside the internal cavity (such as on the back of the body as depicted in FIG. 11). In yet another preferred embodiment, power supply 208 may be positioned in a location which is remote from body 202. In any of these embodiments, the location of power supply 208 is contemplated to minimize water ingress in an effort to avoid failure of power supply 208 which is a known issue.

Body 202 preferably includes at least one feed through port 1036 (FIG. 10) which is preferably adapted to being sealed in a weather tight manner (weather proof pass through). Electrical wiring suitable for providing electrical communication between the power supply 208 and LED printed circuit board 404 is inserted through feed through port 1036. The electrical wiring is inserted through the feed through port(s) 1036 and is preferably secured by a gland suitable to provide a weather tight seal.

Figure 5:
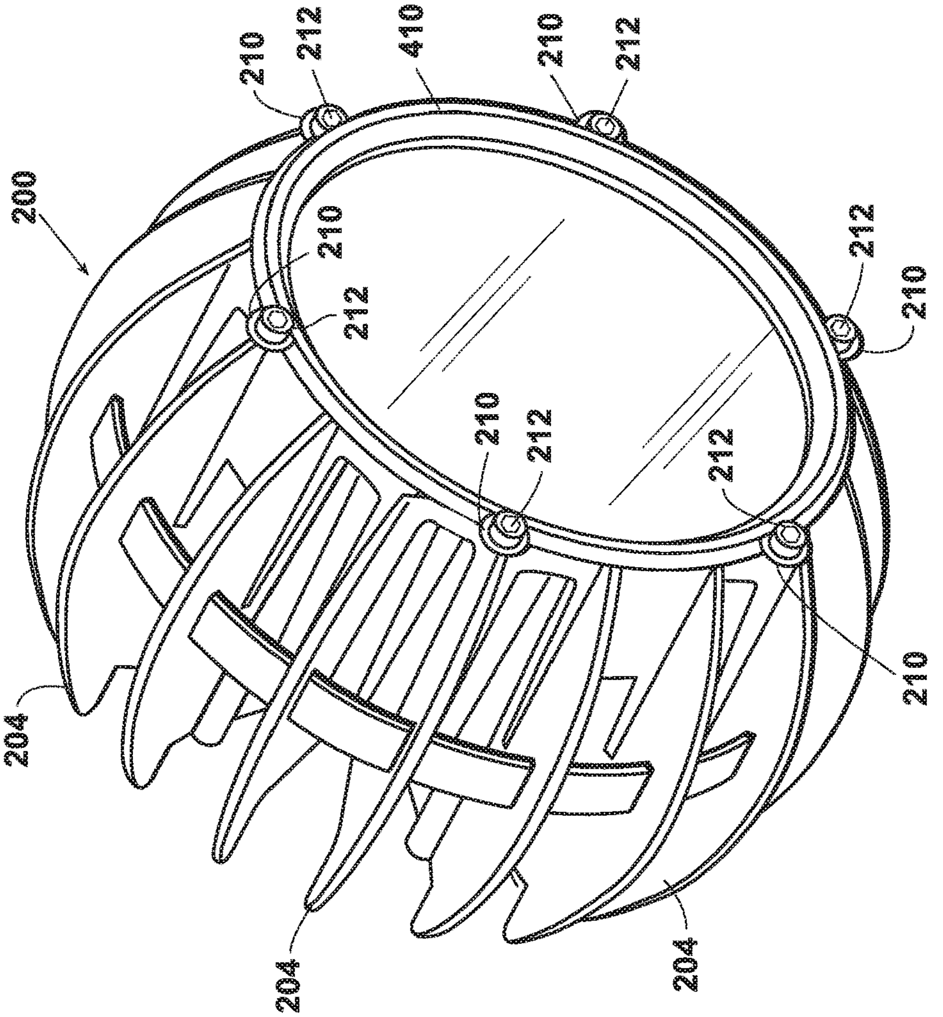
FIG. 5 depicts an isometric view of only the body of the single piece bodied sports light fixture of the present disclosure fitted with a lens retainer ring.

Referring now to FIG. 5 depicting the single piece body 202 of the present disclosure. In this view there are no other parts present except the lens retainer ring 410 secured to body 202 at points 210 using fasteners 212. It is clear in this view just how single piece body 202 is almost an entire fixture by itself.

Figure 6:
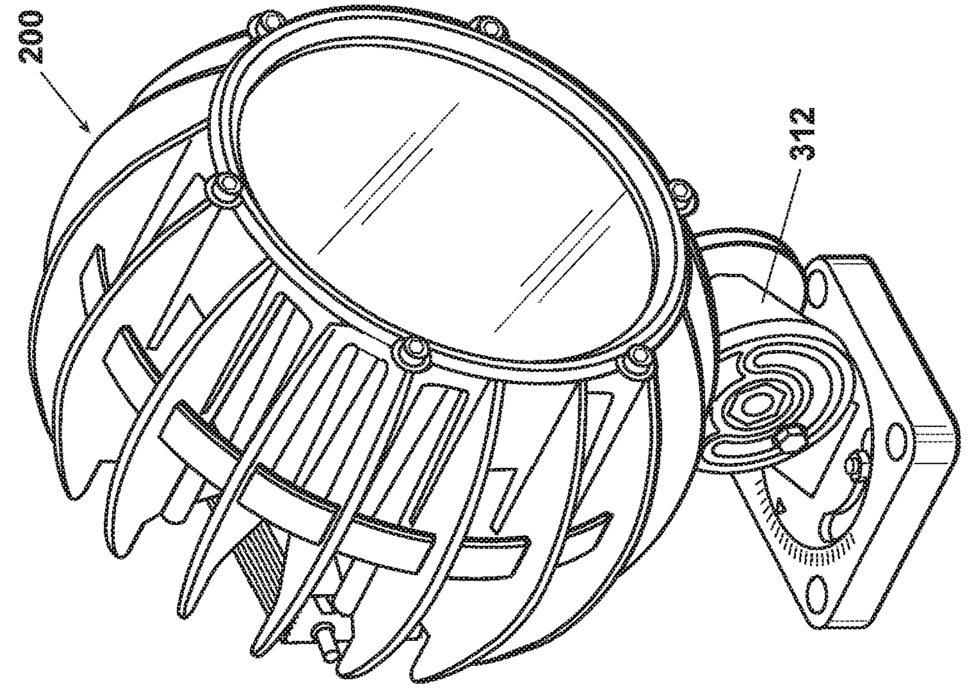
FIG. 6 depicts an isometric view of the single piece bodied sports light fixture of the present disclosure fitted with a bottom knuckle mount.

Referring now to the next drawing, the single piece bodied light fixture 200 of the present disclosure in FIG. 6. In this view the knuckle mount 312 is attached to the bottom of the fixture 200.

Figure 7:
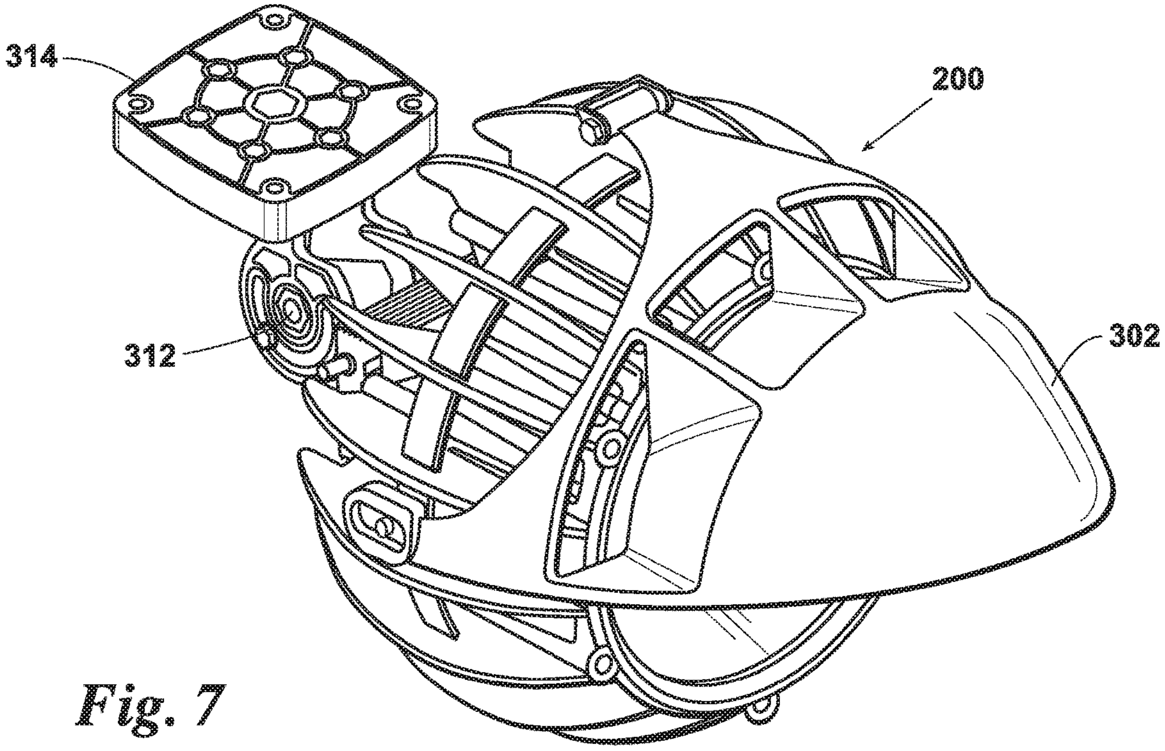
FIG. 7 depicts an isometric view of the single piece bodied sports light fixture of the present disclosure with a back knuckle mount.

Referring next to FIG. 7, the single piece bodied light fixture 200 of the present disclosure. In this view the knuckle mount 312 (mounting means) is attached to the back of the fixture 200, covering the power supply 208 (not shown) for use in an under-slung (pendant mount) mounting orientation. The mounting foot 314 (mounting means) would mount to the bottom of a light pole's cross arm in a known manner, or it would mount to the bottom of a structure. The knuckle mount 312 is tucked away and almost unseen for a visually clean presentation.

Figure 8:
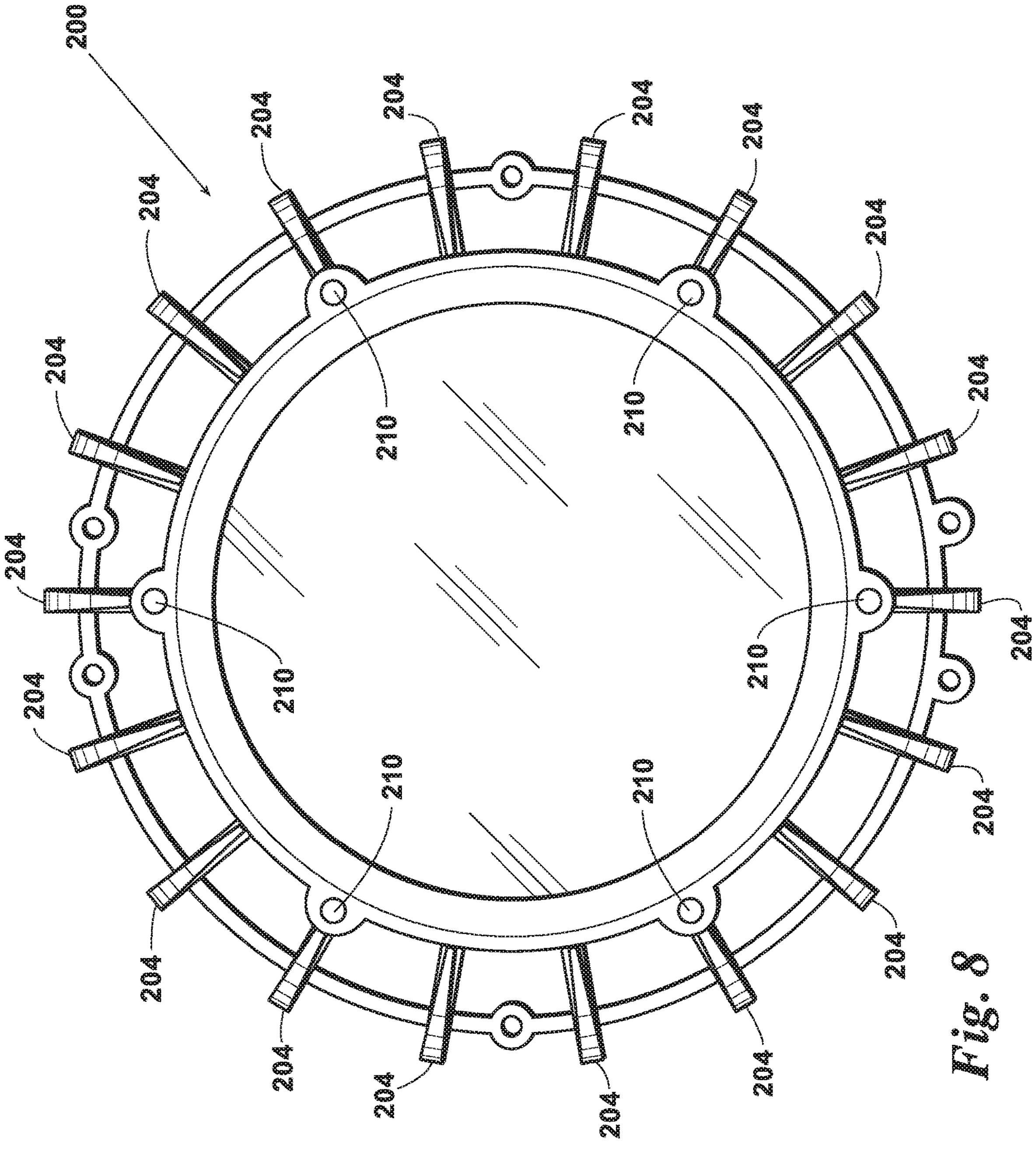
FIG. 8 is a front view of the single piece bodied sports light fixture of the present disclosure.

Referring now to the next drawing, the single piece bodied light fixture 200 of the present disclosure in FIG. 8. In this front view of the fixture 200 one can best see the size and height of the cooling fins collectively 204 near the front of the fixture 200.

Figure 9:
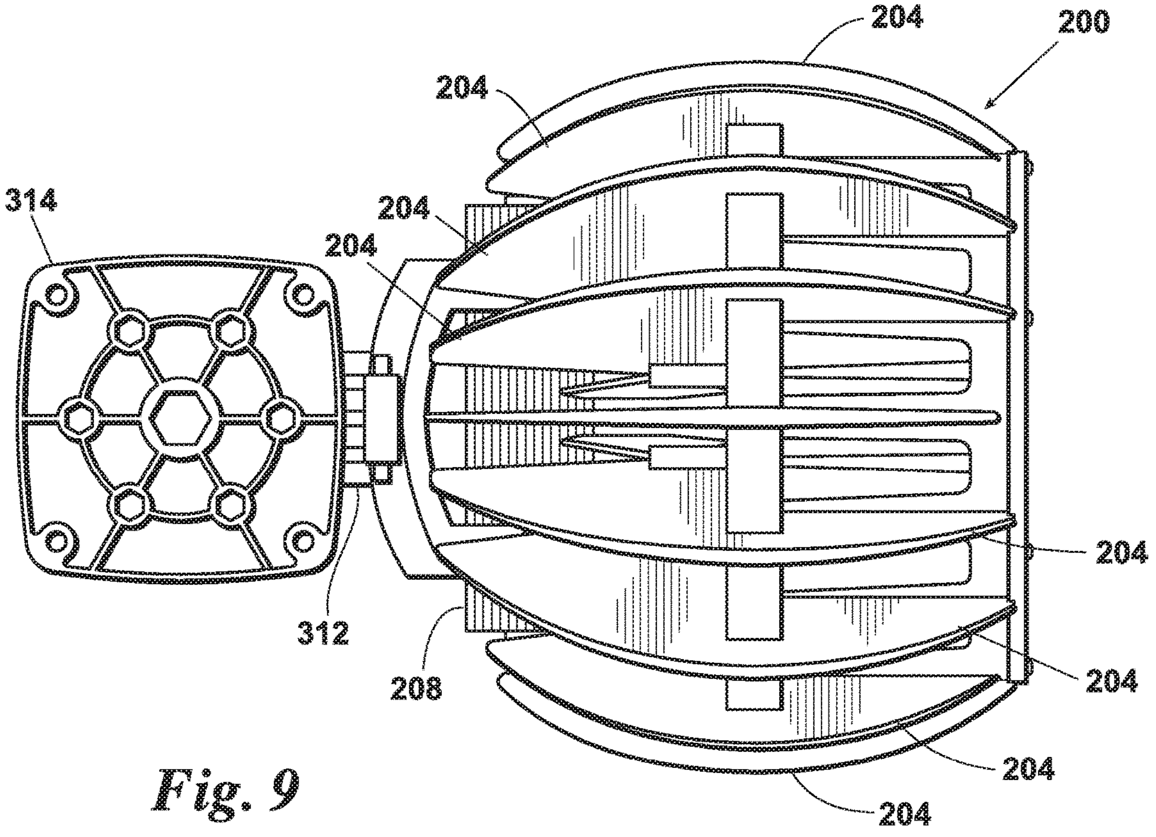
FIG. 9 is a top view of the single piece bodied sports light fixture of the present disclosure fitted with a mounting foot in an under slung mounting orientation.

Referring next to FIG. 9, the single piece bodied light fixture 200 of the present disclosure. In this top view of the fixture 200 one can see the knuckle mount's 312 mounting foot 314 in an under slung mounting orientation, facing up. It can also be seen that the mounting knuckle 312 reaches over the power supply 208 that is nested in between fins 204 in the rear of the housing 200.

Figure 10:
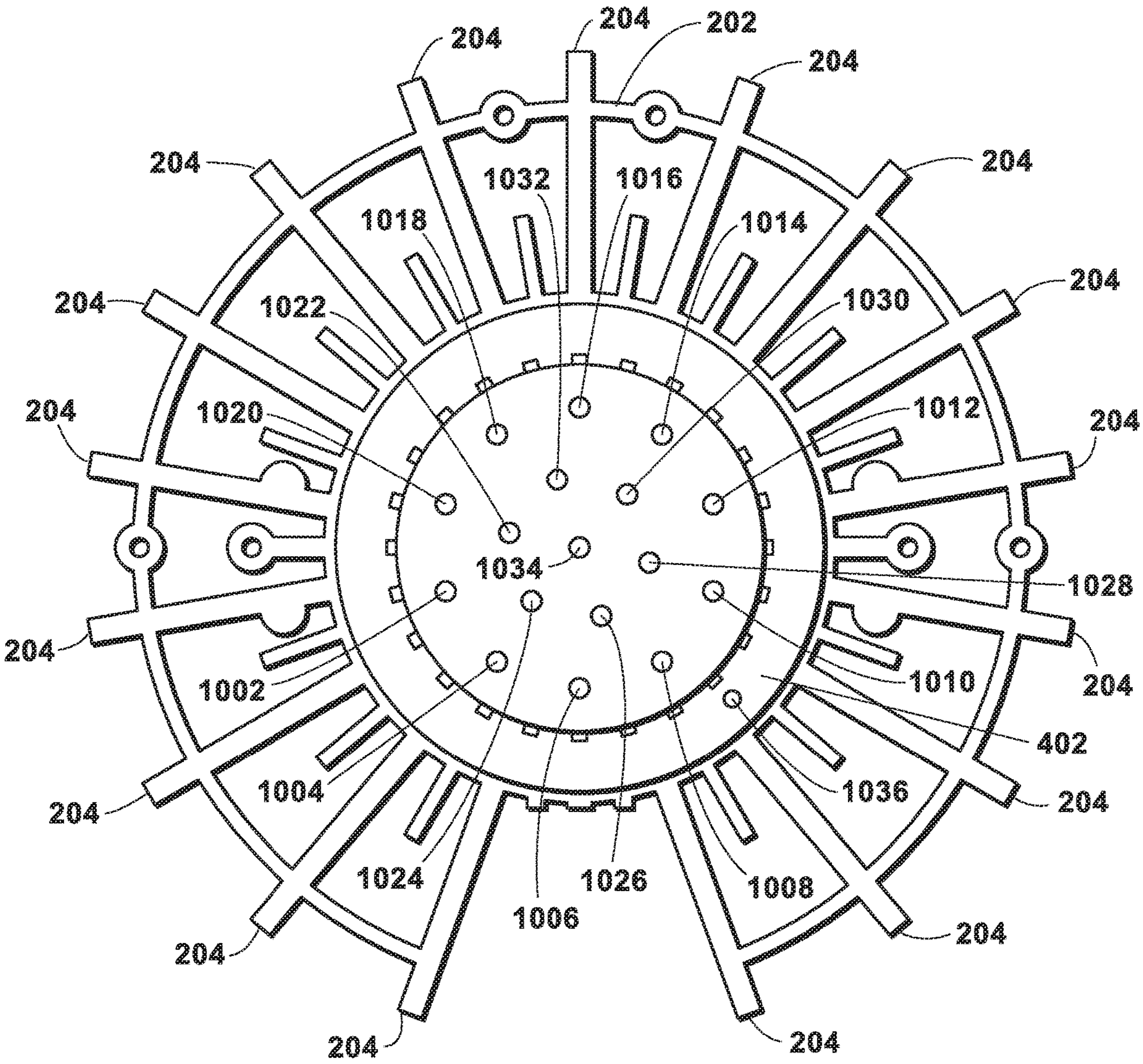
FIG. 10 is a front view of only the body of the inventive single piece bodied sports light fixture of the present disclosure.

Referring now to FIG. 10, the single piece body 202 of the present disclosure. In this front view of the body 202 one can best see the 17 threaded holes 1002-1034 that are at the back of the reflector chamber 402 which are used to mount the LED printed circuit board 404 (FIG. 4).

Referring now to the final drawing, the single piece bodied light fixture 200 of the present disclosure in FIG. 11. In this back view of the sports light fixture 200, one can see the power supply 208 and the bottom-attached knuckle mount 312 oriented so that the foot 316 is ready to be placed on top of an arm or surface for mounting.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A sports light fixture for projecting light, comprising:

a single cast body having an outer dimension and including a plurality of fins on said outer dimension;

said single cast body having a back and a front;

a lens secured directly to said body in a weather tight manner through which the light is projected;

said light is projected in a focused beam having a beam angle of less than 70 degrees;

said body including a reflector cavity to receive an LED printed circuit board;

said LED printed circuit board including an LED array having an input power of at least 250 watts;

a frusto-parabolic reflector secured in said reflector cavity and adapted to shape the projected light;

a power supply secured to said body;

said power supply in electrical communication with said LED printed circuit board;

a plurality of said plurality of fins extend from said back of said body adjacent said LED printed circuit board to said front of said body adjacent said lens.

2. The sports light of claim 1 wherein said lens is secured to said front of said body covering said reflector cavity.

3. A sports light, comprising:

a single cast body having an outer dimension and including a plurality of fins on said outer dimension;

said single cast body including a back, a front opening, and an internal cavity;

said single cast body including a means for mounting;

said internal cavity configured to receive an LED printed circuit board having an input power of at least 250 watts;

said LED printed circuit board capable of projecting light through said front opening;

said light being projected in a focused beam having a beam angle of less than 70 degrees;

said internal cavity including a frusto-parabolic reflector adapted for shaping and directing said light through said front opening;

said front opening including a surface adapted to receive a weather proof gasket;

a lens secured to said body adjacent said weather proof gasket, said lens covering said front opening;

a power supply in electrical communication with said LED printed circuit board;

said single cast body adapted such that said body in cooperation with said weather proof gasket and said lens renders said internal cavity weather tight.

4. The sports light of claim 3 wherein said lens is secured to said body by a retainer ring.

5. The sports light of claim 3 wherein said LED printed circuit board includes an RGBW LED array.

6. The sports light of claim 3 wherein said reflector is comprised of a plurality of reflector segments.

7. The sports light of claim 3 including at least one visor secured to said body.

8. The sports light of claim 3 wherein said printed circuit board is a chip-on-board printed circuit board.

9. The sports light of claim 3 wherein said power supply is secured in said internal cavity.

10. The sports light of claim 3 wherein said single cast body includes at least one feed through port;

said at least one feed through port adapted to being sealed in a weather tight manner.

11. The sports light of claim 10 wherein electrical wiring suitable for providing electrical communication between said power supply and said LED printed circuit board is inserted through said at least one feed through port.

12. The sports light of claim 11 wherein said power supply is secured to said back of said single cast body.

13. The sports light of claim 3 wherein said power supply is remote from said single cast body.

14. The sports light of claim 3 wherein said LED printed circuit board is secured in said internal cavity adjacent said back of said single cast body such that said plurality of fins are located between said LED printed circuit board and said front opening of said single cast body.

15. The sports light of claim 3 wherein said mounting means is a knuckle mount.

16. The sports light of claim 3 wherein said mounting means is a pendant mount.

17. The sports light of claim 4 wherein said LED printed circuit board is adapted for being computer controlled.

18. The sports light of claim 17 wherein said power supply is adapted for dimming said LED array.

19. The sports light of claim 18 wherein said LED printed circuit board includes multiple LED arrays each on a separate channel such that each LED array is capable of being dimmed independently by said power supply.

20. The sports light fixture of claim 18 adapted for being controlled via DMX.

21. The sports light fixture of claim 3 wherein said LED printed circuit board includes an RGB LED array.

* * * * *